Patented Aug. 4, 1931

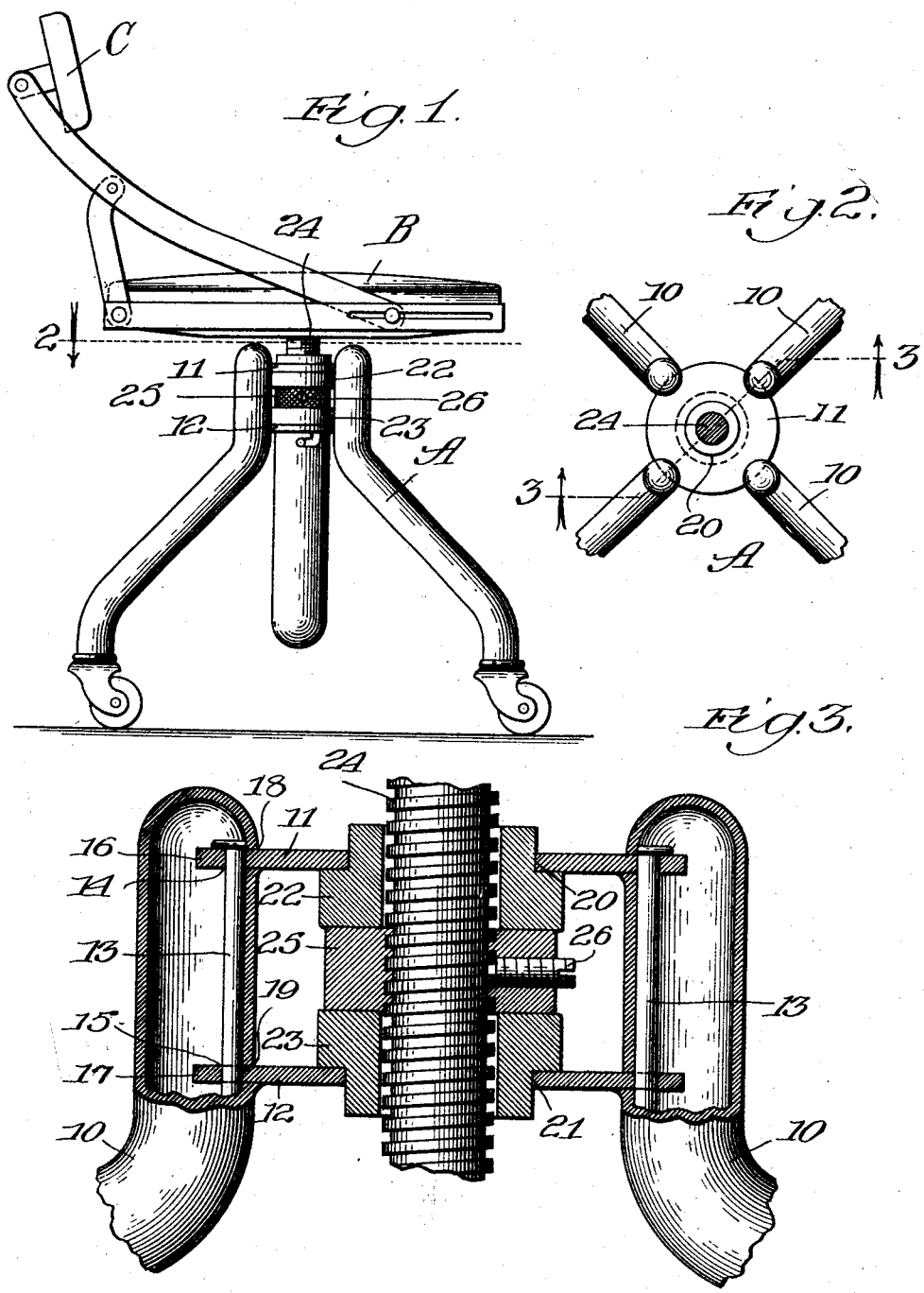
Aug. 4, 1931.     E. C. HARTER     1,817,560
BASE FOR CHAIRS, TABLES, AND THE LIKE
Filed April 30, 1928

1,817,560

UNITED STATES PATENT OFFICE

EVAN C. HARTER, OF STURGIS, MICHIGAN

BASE FOR CHAIRS, TABLES, AND THE LIKE

Application filed April 30, 1928. Serial No. 273,993.

This invention relates to bases for chairs, tables and the like and is fully described in the following specification and shown in the accompanying drawings, in which—

Figure 1 is a side elevation of the chair embodying the invention;

Fig. 2 is a partial plan view on the line 2 of Fig. 1, and

Fig. 3 is an enlarged vertical sectional view on the line 3—3 of Fig. 2.

The embodiment illustrated comprises a chair having a base A, a seat B rotatably mounted thereon, and a back C.

The base consists of legs 10, preferably four in number, which are bent inwardly at the top and secured to two spider-like members or plates 11 and 12, preferably by means of pins 13 passing through openings 14 and 15 in ears 16 and 17. These ears pass through slots 18 and 19 in the sides of the tubular legs 10.

The spiders 11 and 12 are provided with central openings 20 and 21, preferably of the same diameter, and these are adapted to receive shouldered bushings 22 and 23. These bushings are so formed that they may be inserted from the inside, that is, the space between the plates 11 and 12, and forced outwardly as is shown in Fig. 3. These bushings fit tightly into the openings 20 and 21 and, if desired, their edges may be quick punched so as to further secure the bushings therein.

A screw-threaded shaft 24 for supporting the seat B passes through the bushings 22 and 23. A nut 25 lying between the bushings 22 and 23, is threaded to receive the shaft 24 and is screwed thereon so as to provide a means for adjusting the height of the seat B. The set screw 26 is screwed lightly upon the threads of the screw 24 to retain the nut 25 in adjusted position thereon.

Thus it will be seen that a very simple and convenient arrangement is provided and one which enables the operator to adjust the height of the chair seat B with a minimum of time and trouble. To effect this adjustment, the screw 26 is backed off sufficiently to enable the screw 24 to turn in the nut 25. The nut is then held while the seat B is screwed up or down to effect the adjustment desired, after which the set screw 26 is again tightened on the screw 24. The seat B can then be turned round and round without affecting the adjustment as the nut 25 then turns with the screw 24. It will also be apparent that a table or the like may be substituted for the chair seat B.

While I have shown and described but a single embodiment of my invention, it is to be understood that it is capable of many modifications. Changes, therefore, in the construction and arrangement may be made which do not depart from the spirit and scope of the invention which is disclosed in the appended claims.

What I claim is new, and desire to secure by Letters Patent, is:

1. In a base for chairs and the like, two spaced horizontal plates, legs secured thereto, aligned openings in said plates, bushings in said openings, a load-supporting screw-threaded rod in said bushings, and an adjusting nut positioned between, and rotatable relative to, said bushings and screwed on said rod.

2. In a base for chairs and the like, two spaced horizontal plates, legs secured thereto, aligned openings in said plates, bushings in said openings, a load-supporting screw-threaded rod in said bushings, an adjusting nut positioned between, and rotatable relative to, said bushings and screwed on said rod, and a screw for locking said nut on said rod.

3. In a base for chairs and the like, two spaced horizontal plates, legs secured thereto, aligned openings in said plates, bushings in said openings, a load-supporting screw-threaded rod in said bushings, and an adjusting nut positioned between said bushings and screwed on said rod, said bushings having shoulders on the inside so that said nut prevents their withdrawal while it is located between them.

EVAN C. HARTER.